United States Patent Office 3,367,503
Patented Feb. 6, 1968

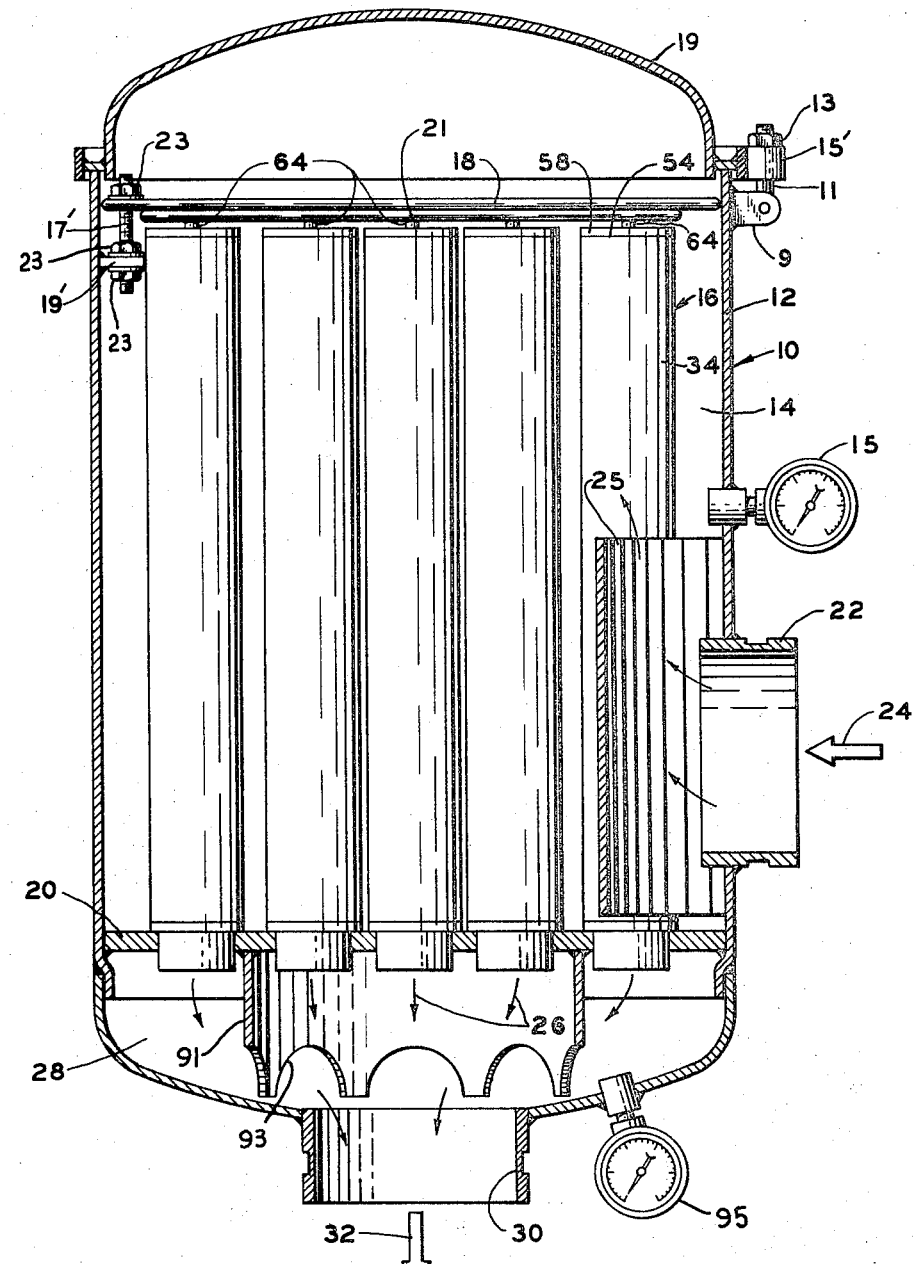

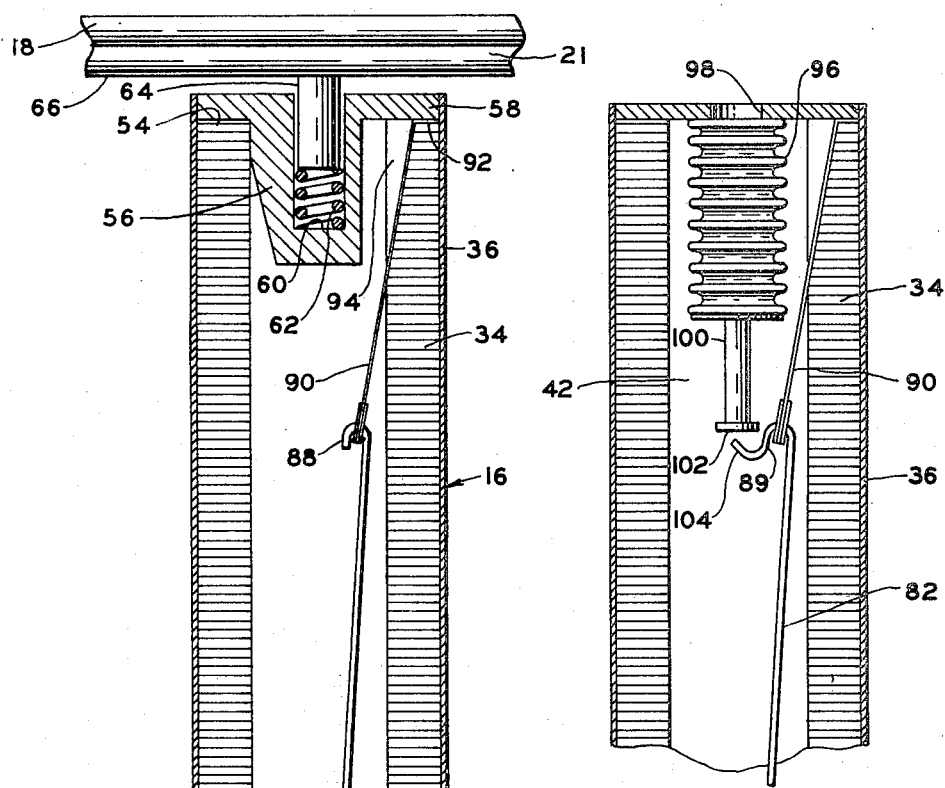
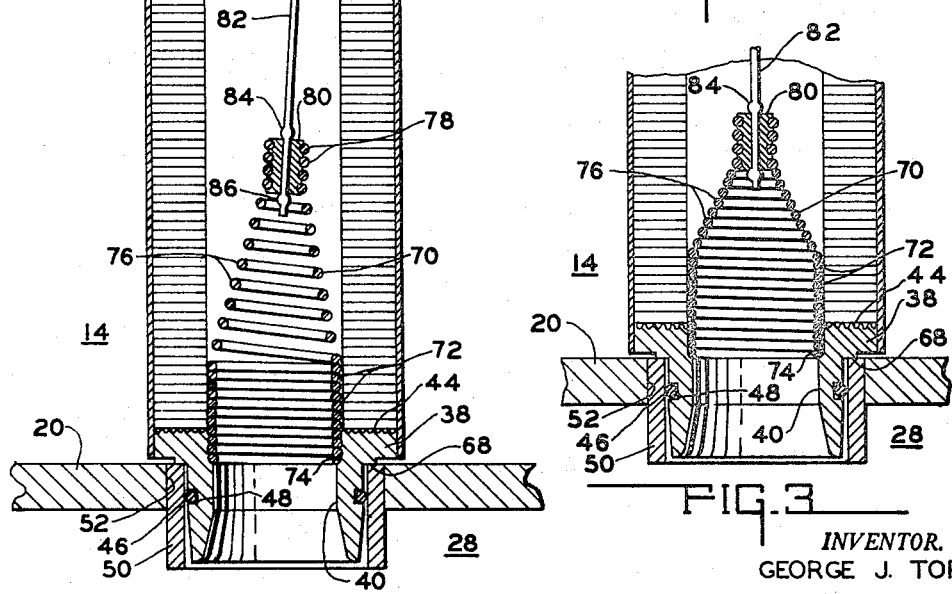

3,367,503
FUSE FILTER WITH WATER SENSITIVE
VALVE CLOSURE TRIGGER
George J. Topol, Hamilton, Ontario, Canada, assignor to Bowser, Inc., Cookeville, Tenn., a corporation of Indiana
Filed July 12, 1965, Ser. No. 471,008
4 Claims. (Cl. 210—96)

ABSTRACT OF THE DISCLOSURE

A fuse filter having a resilient spring valve held in a normally open, extended position within said filter by a combination of loading structure and a water sensitive paper trigger. The paper trigger is weakened by water contamination to a yield point exceeded by the loading of the spring valve and at such point the trigger breaks and closes the spring valve to prevent further flow through the filter. A bellows sensitive to pressure differentials across the filter can also be utilized to effect closing of the spring valve by physically causing the paper trigger to break when an excessive pressure differential occurs.

This invention relates to a fuse adapted for operation in a filter apparatus, and more particularly, it refers to a fuse which is responsive to predetermined degrees of contamination of either liquid or solid character to terminate flow through a filter.

In the process of filtering fluids, it is desirable to detect excessive quantities of contaminants and to terminate operation of the filter, preventing further movement of fluid through the filter when it is excessively contaminated. The fuse serves as a safety mechanism in determining at what level of contamination the filter will be rendered inoperative. The fuse is intended not to interfere with the normal operation of the filter and it should become operative to shut off the flow of fluid through the filter only at a predetermined degree of contamination. Until the point of excessive contamination is reached, it is an important requisite that the fuse will remain non-interfering with the normal operation of filtration including solids and water removal by the filter.

Accordingly, it is one of the principal objects of the present invention to provide a fuse construction which can be readily adapted to suit various operational requirements and is adapted to be operative at a pre-selected level of contamination.

It is a further object of the present invention to provide a fuse which is substantially noninterfering with normal filter operation, and is also adapted to handle a substantial range of flow and is readily adapted for shutting off the fluid flow at precisely the desired contamination level.

It is an important feature of the present invention that the fuse will effect shut off of flow without delays, said termination of operation being precisely established and providing free flow of fluid at all conditions of fluid contamination less than the predetermined maximum amount. Because the fuse is not prematurely operated, a greater useful life can be obtained from the filter elements, while at the same time achieving the principal aim of the fuse, which is to accurately monitor excessive quantities of contaminants.

An over-all object of the present invention is to provide a simply constructed, inexpensive fuse which is reliable in operation and can be adapted to operate precisely at the prescribed amount of contamination of fluid, which realizes maximum use of the filter elements while still achieving the primary purpose of the fuse, which is to shut off the flow of fluid through the filter when a predetermined maximum amount of contaminate has been removed by the filter elements.

Other objects and features of the present invention will become apparent from a consideration of the following description, which proceeds with reference to the accompanying drawings, wherein:

FIGURE 1 is a side elevation view of a filter assembly having a number of filter elements therein;

FIGURE 2 is a longitudinal section view of a filter element incorporating the present invention therein, in which the spring valve controlling the outlet for the filter is in an open position;

FIGURE 3 illustrates the spring valve in FIGURE 2 in a closed or triggered position, blocking further passage of fluid; and FIGURE 4 illustrates a modification of the invention shown in FIGURE 2 having a bellows responsive to pressure differential and sensing the accumulation of solid contaminants for triggering the fuse which is incorporated in the filter.

Referring now to the drawings, FIGURE 1 illustrates a filter apparatus designated generally by reference numeral 10 including a casing 12 which defines an inlet chamber 14 having a plurality of filter cartridges 16 which are disposed between deck plates 18 and 20. The chamber 14 has an upper cover 19 which is received by lugs 9 having pivoted pins 11 which pass through sleeves 15' and are secured thereto by nuts 13, the sleeves 15' being secured to the cover 19. A fluid inlet 22 provides an inflow of fluid indicated by the arrow 24 which enters chamber 14 and thereafter passes through the filter cartridges 16 and discharges from the interior of the filter cartridges as indicated by the arrows 26 into an outlet chamber 28 and then leaves the chamber 28 through an outlet 30 as indicated by the arrow 32. The tank 12 is provided with a pressure gage 15 connected to the chamber 14.

Referring next to the fuse construction illustrated in FIGURES 2 and 3, wherein each of the cartridges 16 has a porous cartridge element 34 surrounded by a pervious sleeve 36 which serves as an enclosing means for the filter element 34. At the bottom end of each cartridge 16 is a nozzle or adapter 38 having a central opening 40 which serves as a discharge for the filtered fluid after it passes into the interior 42 of the filter element 34. End 44 of the adapter 38 is serrated to form a seal at the opposed end of the element 34. The adapter 38 has an O-ring seal 46 received in a groove 48. The O-ring 46 bears against the sleeve 50 which is mounted in an opening 52 of lower deck plate 20 whereby the inlet chamber 14 is separated from the outlet chamber 28.

The upper end 54 of the filter element 34 has an end cap 56 which is biased downwardly so that its annular shoulder 58 sealingly engages the end 54. The end cap has an interior socket 60 which receives a spring 62 compressed by a pin 64 bearing against the undersurface 66 of upper deck plate 21 having a backup plate 18 which is fastened to the interior of casing 12 through spaced lugs 19' which are welded to the casing and have threaded stems 17' with threaded nuts 23 (FIGURE 1) clamping the members 18, 21 downwardly against the ends of the filters. Compression of spring 62 urges the end cap 56 against the end of the filter element 34 and the filter element in turn is biased against deck plate 20 by engagement of shoulder 68 with sleeve 50.

Within the cartridge 16 is a spring valve 70, the purpose of which is to terminate operation of the filter after a predetermined amount of contamination from water, or from solid contaminants has been removed from the filter. The valve 70 is in the form of a spring having a pile of cylindrical coils 72 which form a closed stack and which bear against shoulder 74 of adapter 38 and are held by the adapter as the spring is stretched to the position shown in FIGURE 2. The spring valve includes a number of conically configured coils 76 which provide spacing between adjacent stretched coils providing access for flow of liquid through the valve. A number of reduced diameter coils 78 are threadedly joined to a plug 80 which is secured to a wire 82 by spaced bosses 84, 86, and the end of the wire 82 has a hook 88 joined to a tearable paper element 90 which is clamped at end 92 between the end cap 58 and the end 54 of the filter element 34. The filter element is recessed at 94 to receive part of the paper element 90.

The spring valve 70 is held in a normal stretched position indicated in FIGURE 2 during operation of the filter under removal of contamination which is non-excessive. The paper trigger 90, can be in the form of water sensitive filtration paper; by way of example and not limitation, the trigger paper may be of a conventional cellulose laboratory-type filtration paper. Such paper is insensitive to fuel or other material undergoing filtration, but upon exposure to water, the paper will weaken and its tensile strength is exceeded by the spring rate of spring valve 70 in its stretched position, thereby causing the paper trigger 90 to tear and then spring valve 70 will retract to a solid column, the conical coils 76 (FIGURE 3) will contract to a solid column and plung 80 will seal the end of the conical spring pile whereby the valve 70 in relaxed position will block the passage of fluid through the valve.

The purpose of the recess 94 is that a portion of the trigger 90 is exposed to water before it can penetrate the full depth of the element 34. The shallower the recess 94, the deeper the penetration of water is permitted before triggering the valve 70; and conversely, the deeper the recess 94, the closer the trigger lies to the outer surface of the filter element 34 and, hence, the more sensitive the valve operation to the presence of water. That is, the paper trigger 90 is operated faster or slower in advance of water penetration in the cartridge to thereby affect fuse sensitivity.

When water touches the paper triggering element 90, it immediately reduces the paper 90 to approximately 10 percent of its original strength. The sensitivity of paper to water is constant and provides a reliable indication of the presence of water. The sensitivity of fuse operation is controllable by the configuration of the groove or recess 94; i.e., the fuse 70 will be triggered substantially in advance by forming a deeper recess 94 which disposes the paper trigger closer to the outer surface of the filter element. Conversely, the sensitivity is decreased by forming a shallower recess and causing the paper trigger to be disposed closer to the inner surface of the filter element 34.

The filter element will retain a certain quantity of water before triggering the paper trigger 90 and actuating the spring valve 70, but the sensitivity of operation of the spring valve is in no way related to the flow rate through the filter or the presence of the fluid as it passes through the filter element. Sensitivity is related solely to the configuration of the recess 94 and the size and characteristics of the paper trigger 90. Both of these considerations are independent of the flow of fluid undergoing test making it possible to relate sensitivity only to the degree of contamination. Moreover, the operation of the fuse is such that it does not interfere with the operation of the filter; the fuse is allowed to function without impairment of the filter. At the same time, the monitoring ability of the fuse is so precise that once a predetermined degree of water contamination is encountered, at which point the fuse should operate, the trigger 90 will immediately tear and the spring valve 70 will snap to closed position substantially immediately. If desired, the filter element can be further strengthened by inserting within it a strong perforated tube (not shown) which will protect the filter element from collapse under high pressure. The efficiency of the fuse can also be altered by wrapping a layer of fine filtering medium (not shown) around the exterior of the filter cartridge.

The fuse can be made to operate responsively to accumulation of solid contaminants by means of a bellows 96 (FIGURE 4) having an interior which is exposed to the pressure within chamber 14 through port 98, and the exterior of the bellows is exposed to the pressure within the interior chamber 42. When the pressure differential becomes in excess of a predetermined amount, owing to accumulation of contaminants in the filter element 34, there will result expansion of the bellows 96 under such pressure differential and move the stem 100 toward the hook 89 and cause head 102 to contact end 104 of the hook 89 which will break the paper trigger 90 and actuate the spring valve 70. The valve 70 is thus operable both by the presence of water of a predetermined maximum amount because of loss of strength of the paper trigger 90 and also by the bellows 96 at a predetermined degree of solid contamination of the filter element 34.

In operation, the chamber 14 (FIGURE 1) has a number of cartridges 16 which are mounted therein and each cartridge is separately and independently operable. At the beginning of operation, each of the spring valves 70 is stretched to the position shown in FIGURE 2 and held stretched by tension force communicated through a paper trigger 90 which is sensitive to moisture, whereby in the presence of moisture, it will lose its tensile strength immediately and the spring rate of the spring valve 70 will exceed the strength of the paper trigger 90 and then snap to a closed position after breaking the triggering element 90, precluding further passage of the fluid through the filter. The parameter of depth of the recess 94 controls sensitivity of the fuse and the fuse is in no way sensitive to other parameters of filter operation, such as flow rate, color, composition, etc., hence the filter can function efficiently and without interference up to the point of maximum moisture content, at which point the fuse immediately operates to terminate the filter operation.

The fuse can also be operated responsively to the degree of contamination of the filter by means of a bellows 96 which will expand when pressure differential increases across the filter, owing to accumulation of excessive contaminants in the filter element. As the bellow expands, the head 102 on stem 100 engages end 104 of the hook 89 and breaks the paper triggering element 90, allowing the spring valve 70 to snap closed.

Within outlet chamber 28 which receives the discharge flow is a depending cylindrical member 91 having semicircular notches 93 which channel flow into outlet 30. The chamber 28 has a gauge 95 which, together with gauge 15 gives the total presure drop occuring during filter operation.

As indicated in FIGURE 4, the fuse can be used to monitor moisture and solid contaminants and up to the point of predetermined contamination from either solid or liquid, the filter functions without interference. But immediately upon occurrence of the predetermined degree of contamination, the spring valve 70 will function and terminate further operation. It has been found that with a plurality of cartridges, each operating independently, ther is a time ratio between triggering the first fuse and the last fuse of approximately 2:3. If, for example, the first fuse is triggered after approximately 10 minutes, and the contamination of the fluid undergoing filtration remains constant, then the last fuse will operate in approximately 15 minutes, effecting complete shut off of the apparatus.

Although the present invention has been illustrated and described in connection with a few selected example embodiments, it will be understood that these are illustrative of the invention and are by no means restrictive thereof. It is reasonably to be expected that those skilled in the art can make numerous revisions and adaptations of the invention, and it is intended that such revisions

What is claimed is:

1. In a filter assembly, the combination of: a porous, tubular filter element permitting flow of fluid therethrough from the outside of the tubular filter element to the inside thereof, resilient means disposed within said filter element and configured to provide in its extended position a plurality of openings through which fluid can flow from the interior of the filter element, said resilient means configured to provide in its nonextended position a substantially closed barrier to the passage of fluid from the interior of the filter element, means defining an outlet port in said filter assembly which receives the flow of discharge fluid through the openings of said resilient means, means for effecting loading of said resilient means to an extended position to provide the said openings, and means including an operative connection with said loading means and having a structure which is weakened under exposure to moisture to a yield point exceeded by the loading of the resilient member in its extended position, said moisture sensitive structure constructed and arranged to break when said yield point is exceeded to cause said resilient means to be disposed in its nonextended position.

2. In a filter assembly, the combination of: a porous filter element permitting flow of fluid therethrough from the outside of the filter element to the inside thereof, resilient means disposed within said filter element and configured to provide in its extended position a plurality of openings through which fluid can flow from the interior of the filter element to an outlet port, said resilient means configured to provide in its nonextended position a substantially closed barrier to the passage of fluid from the interior of the filter element, moisture sensitive means disposed within said filter element means for connecting the resilient means to the moisture sensitive means to extend said resilient means for filter operation, said moisture sensitive means including a structure which is weakened under exposure to moisture to a yield point exceeded by the loading of the resilient means in its extended position to cause breaking of said moisture sensitive means and to cause said resilient means to be disposed in its nonextended position.

3. In a filter assembly as set forth in claim 2, wherein the filter element is provided with a recess for receiving a portion of the moisture sensitive means.

4. A filter assembly as set forth in claim 2, including fluid pressure differential responsive means actuable in accordance with the degree of contamination of the filter element, and means responsive to said fluid pressure differential means for releasing the external load on said resilient means to cause said resilient means to be disposed in its nonextended position.

References Cited

UNITED STATES PATENTS

| 2,404,621 | 7/1946 | Davis | 210—100 |
|---|---|---|---|
| 2,632,566 | 3/1953 | Morrison | 210—100 |
| 3,298,522 | 1/1967 | Muller | 210—96 |
| 337,431 | 3/1886 | Pintsch | 137—505.41 |
| 2,798,503 | 7/1957 | Carver et al. | 137—67 |
| 3,339,734 | 9/1967 | Kasten | 210—96 |
| 3,339,735 | 9/1967 | Kasten | 210—100 |

REUBEN FRIEDMAN, *Primary Examiner.*

W. S. BRADBURY, *Assistant Examiner.*